June 19, 1923.  1,459,080

H. ARNSTEIN ET AL

MOVABLE UNLOADING PLATFORM

Filed March 21, 1921  2 Sheets-Sheet 1

WITNESS
A. E. Alberg.

INVENTORS
H. ARNSTEIN AND
C. M. MARDEL
BY
White Frost Evans
their ATTORNEYS

June 19, 1923.
H. ARNSTEIN ET AL
1,459,080
MOVABLE UNLOADING PLATFORM
Filed March 21, 1921     2 Sheets-Sheet 2
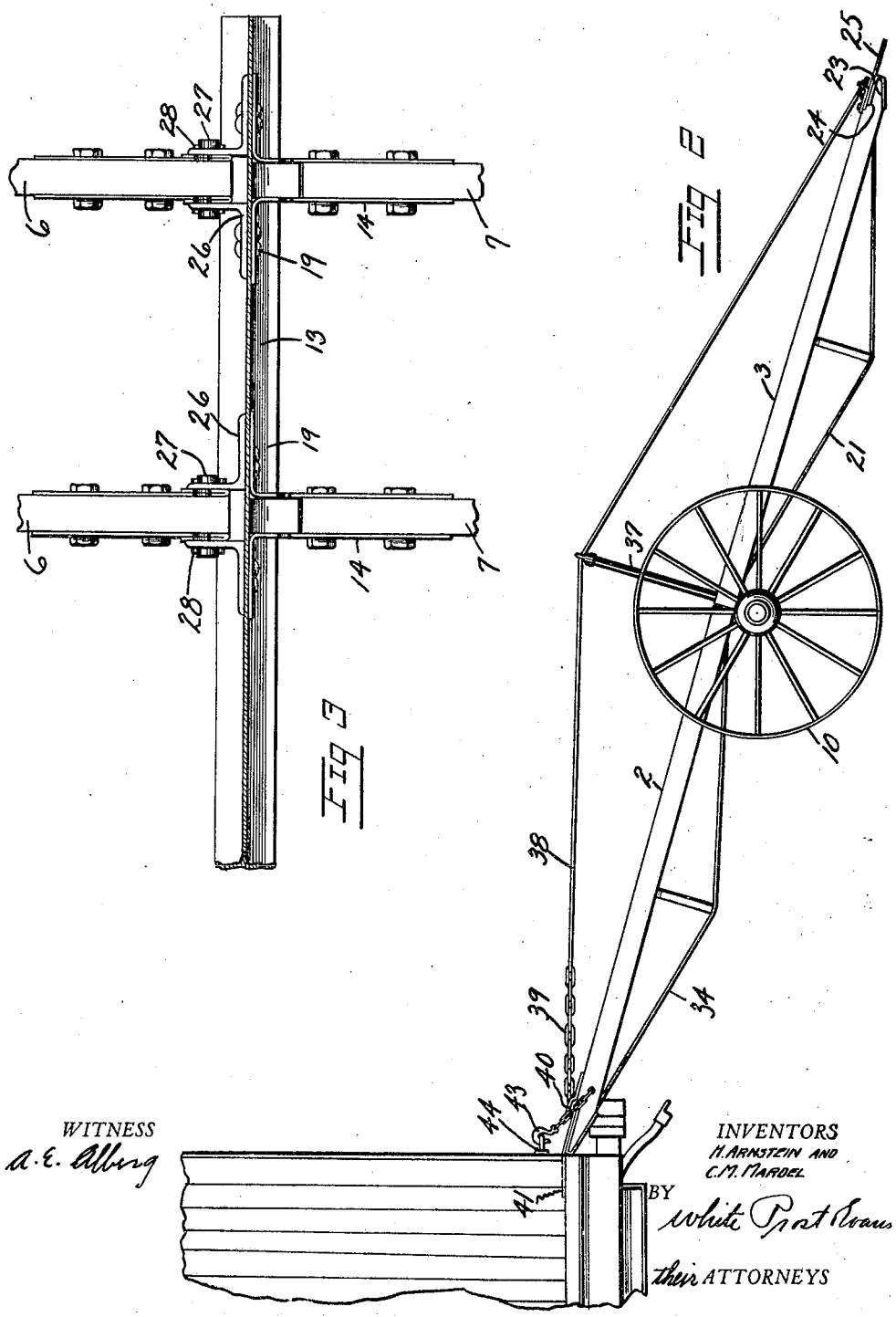

Patented June 19, 1923.

1,459,080

UNITED STATES PATENT OFFICE.

HUGO ARNSTEIN AND CHARLES M. MARDEL, OF OAKLAND, CALIFORNIA.

MOVABLE UNLOADING PLATFORM.

Application filed March 21, 1921. Serial No. 453,977.

*To all whom it may concern:*

Be it known that we, HUGO ARNSTEIN and CHARLES M. MARDEL, citizens of the United States, and residents of the city of Oakland, county of Alameda, State of California, have invented a new and useful Movable Unloading Platform, of which the following is a specification.

This invention relates to portable, unloading apparatus for adjustment contiguous to door-ways of freight cars.

It is an object of the invention to provide a wheeled platform adapted to be readily arranged adjacent to the door-way of a freight car, either of the side or end door type.

A further object of the invention is to provide a platform having relatively adjustable end sections to readily adapt the platform to car floors of different heights.

Another object of the invention is to provide a wheeled unloading platform with transversely hinged sections providing for angular adjustment respectively, and having means for connecting the sections to support them in suitable arrangement when it is desired to move the platform from place to place.

Further, it is an object of the invention to provide a substantially constructed and durable, movable, adjustable platform to facilitate the unloading of wheeled vehicles, particularly automobiles, from freight cars.

The invention possesses other objects and features of advantage, some of which, with the foregoing, will be made manifest in the following description of the preferred form of the invention which is illustrated in the drawings accompanying and forming part of the specification. It is to be understood that it is not intended to limit the invention to the embodiment shown by the said drawings and description as variations may be adopted within the scope of the invention as set forth in the claims.

Fig. 2 is a side elevation and partial section of the platform adjusted to a freight car for unloading purposes.

Fig. 3 is a plan and partial section showing in detail a portion of the beam and joist structure of the floor of the platform.

Figure 1:
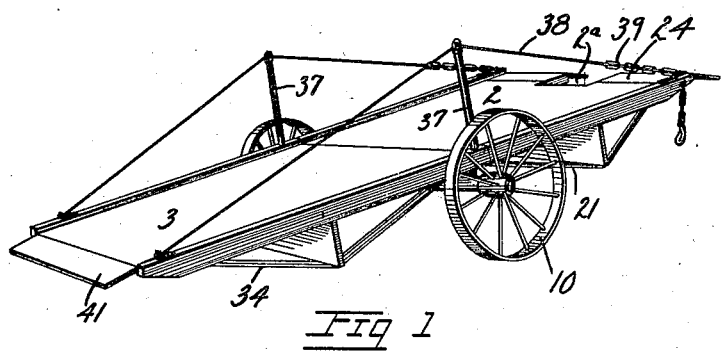
Fig. 1 is a perspective of the platform.
Figure 4:
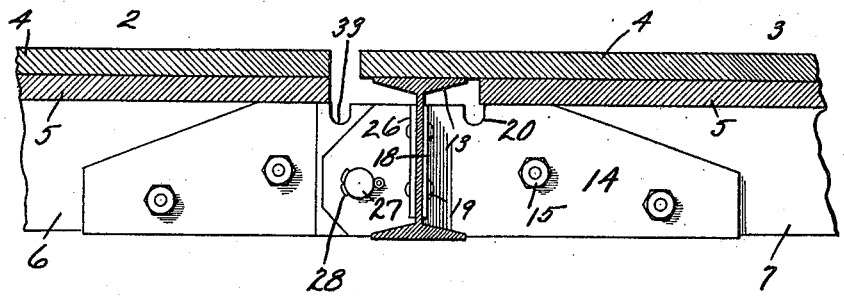
Fig. 4 is an end view of the structure of Fig. 3.
Figure 5:
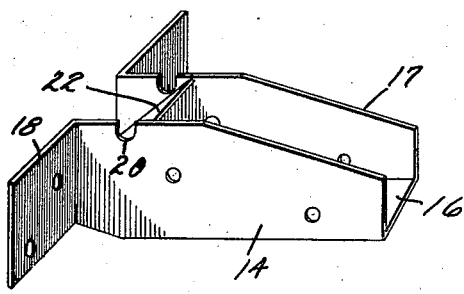
Fig. 5 is a perspective of a joist hanger.
Figure 6:
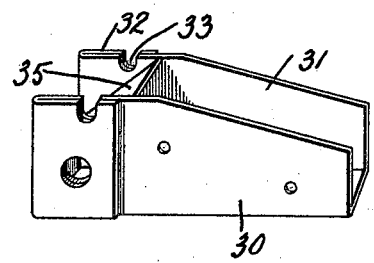
Fig. 6 is a perspective of joist pivot box.
Figure 7:
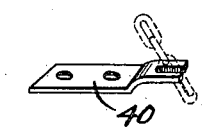
Fig. 7 is a perspective of a cleat for attachment of a guy chain.

It is desirable to provide improved means for increasing the ease, and decreasing time and labor, in the removal of automobiles from freight cars irrespective of whether the cars have side or end doors and irrespective, also, of the variations of the heights of car floors.

Commonly, loaded cars are switched and shifted with care and much time to a definite unloading spot at a station so that the automobiles may be rolled from car to a stationary platform.

The present invention consists of a substantially constructed portable or wheeled sectional apron or platform that may be readily shifted from car to car at any desired location along the track or tracks, and provides for adjustment to enable the car engaging end of the platform to be raised or lowered with respect to the ground to meet the floors of different cars. The invention further consists of means for so connecting the parts of the platform that it may be moved bodily as a rigid structure on supporting wheels.

The platform preferably comprises a set of sections 2 and 3 having suitable flooring 4 laid, if desired, upon a diagonal floor 5, which is laid upon longitudinal joists 6 of section 2, and joists 7 of section 3.

Any suitable number of the parallel joists 6—7 may be used in the sections.

The sections are hingedly connected on a substantially medial transverse line of the platform, that is, the sections 2 and 3 are hinged or pivoted at contiguous ends. This articulate connection may be achieved in various ways so that while one end section may be regarded as resting stationary upon the ground the other may be swung vertically on a horizontal axis to enable its swinging edge to be deposited on or contiguous to the edge of a car floor or platform so that an automobile or other vehicle or object may be readily rolled or worked onto the platform section.

The intermediate part of the platform is supported at or adjacent to the hinge to carry the load and determine the degree of the incline of the platform. The supporting means preferably consists of a pair of wheels 10 on an axle.

A practical construction is shown, in which axle spindles are secured to the bottom of a main, transverse beam. This may be an I-beam 13. To one side of this is applied a series of spaced hangers 14 in which are seated and fastened, as by bolts 15, ends of the joists 7 of section 3.

To secure rigidity and strength each hanger 14, as shown, has a flat bottom 16 with up-standing side walls 17 having out-turned flanges 18 perforated to take fastenings 19 passing through the web of the I-beam 13. The top edges of the flanges 18 are notched at 20 to receive longitudinal truss-rods 21.

An end wall of the hanger is bent inwardly at 22 over the bevelled corner of the respective joist 7, which is bolted or otherwise fastened in the hanger. The opposite ends of the joists 7 are bevelled off on the lower faces and are provided with a wearing plate 23 which may be bent over the joist-ends and down on the top at 24.

When the foot or base section 3 is lowered against the ground a bridge plate 25, secured on the upper face of the platform end, serves to prevent shock as the automobile rolls off of the flooring.

The hinge connecting the two sections 2 and 3 and is here shown as including pairs of angle brackets 26 secured on one face of the web of the beam 13 by the rivets 19 and through each pair of brackets extend pivot pins 27, held by cotter pins 28, or otherwise.

The contiguous ends of the joists 6 are each encased in a box 30 having side walls 31 which are doubled on themselves at 32 and perforated to receive its pivot pin 27. The flanges of the angle brackets embrace the side folds 32 of the inserted boxes and the pins 27 are in alinement and thus form the pivotal connection between the sections 2 and 3 of the platform.

The boxes 30 have notches 33 at their top edges to receive the adjacent ends of truss rods 34, and the ends of the boxes are bent in at 35 over the bevelled ends of the joists 6. By this means a very strong hinge connection is secured between the joists 6 of the platform section 2 and the cross beam 13 of the platform section 3.

Each section is thoroughly braced by bottom trusses 21 and 34.

To support the hinged section, when this may be desired, a simple but strong and easily manipulated device is employed. Such a device is shown as including a pair of trusses having posts 37 erected on the hinged end of the platform section 3 and supporting tension elements 38. These elements have end chains 39 adapted to be readily hooked to or unhooked from platform cleats 40 to hold the sections as shown in Fig. 1 or to release them to swing on the pivot pins.

To adjust the platform to a car floor the former is wheeled into position at the side or end of the car and the truss chains 39 disconnected from the cleats 40. This permits metal lip plates 41 on the car engaging end of section 2 to overlap the floor of the car at the door thereof while the toe plate 25 of section 3 bears on the ground.

In instances where end-door cars are to be unloaded the platform section 2 is set up against the car end and the coupler elements are cleared in a cut-away $2^a$ in the end of section 2.

The wheels of the platform forms a medial support both when the platform is used in unloading and when it is being shifted about, and in the latter case the platform is substantially balanced on its wheels.

The platform may have means for connecting it to the car, as for instance hooks 43 to engage eyes 44 on the car.

While in the specification we have set forth the advantage of the device for loading and unloading freight cars, it is to be understood that it is not limited to that use, but may be advantageously employed for loading and unloading trucks or other vehicles and generally for moving articles and materials from one place to another.

What is claimed is:

1. An inclined unloading platform for unloading railway cars comprising two rigidly connected platform sections of substantially equal length adapted to assume different angular relations, whereby the platform may be adjusted to cause the upper end to lie in the plane of the car floor, and the lower end to rest on the ground, while maintaining the substantial continuity of the platform.

2. An inclined unloading platform comprising two rigidy connected platform sections adapted to assume different angular relations whereby the vertical distance between the upper end of the platform and the ground may be varied to accommodate the platform to floors of varying height and wheels on which the platform is mounted.

3. A sectional platform having supporting wheels on which it is substantially balanced to be wheeled about, the sections being hinged on a medial, transverse line of the platform.

4. An unloading platform having supporting wheels on which it is substantially balanced to be wheeled about and having transversely hinged sections and means for temporarily holding the sections in a given relation.

5. A portable unloading platform comprising transversely, hingedly connected platform sections adapted to assume different angular relations and wheeled supporting means disposed substantially in the vertical plane of the hinge.

6. A portable platform having sections hingedly connected transversely to the platform and truss means for temporarily holding the section in a given position.

7. An unloading platform having transversely and medially hingedly connected sections and having a pair of wheels whose axis is parallel to the hinge connection for supporting the platform either for movement bodily from place to place, or when set in an inclined, unloading position.

8. An unloading platform consisting of an axle having end wheels, and a pair of platform sections hingedly connected medially and transversely of the platform and being supported at their hinged ends on the axle so that either end of the platform can be raised or lowered as to the other and as to the axle.

9. An unloading platform consisting of an axle having end wheels, and a pair of platform sections hingedly connected medially and transversely of the platform and being supported at their hinged ends on the axle so that one end can be swung to a resting position on a car floor while the other end is resting upon the ground.

In testimony whereof, we have hereunto set our hands.

HUGO ARNSTEIN.
CHARLES M. MARDEL.